Patented Oct. 11, 1949

2,484,530

UNITED STATES PATENT OFFICE 2,484,530

COPOLYMERS OF 3,3,3-TRIFLUOROPROPENE

Herman Elbert Schroeder, Wilmington, Del., assignor to E. I. du Pont de Nemours & Company, Wilmington, Del., a corporation of Delaware No Drawing. Application May 24, 1948, Serial No. 28,967

4 Claims. (Cl. 260—87.5)

This invention relates to new compositions of matter, and more particularly to polymeric materials.

It is an object of this invention to produce new and useful compositions of matter. Another object is the preparation of valuable high molecular weight polymers. Other objects will be apparent from the following description of the invention.

These objects are accomplished by the following invention of polymeric materials comprising copolymers of 3,3,3-trifluoropropene with polymerizable ethylenically unsaturated aliphatic hydrocarbons more particularly described hereinafter. These copolymers are obtained by reacting 3,3,3-trifluoropropene with the mentioned unsaturated hydrocarbons under superatmospheric pressure.

The following examples in which the parts given are by weight further illustrate the products of this invention.

Example I

Into a silver-lined, high-pressure reactor, which has been just previously flushed with oxygen-free nitrogen, is charged 200 parts of oxygen-free water and 0.15 part of lauroyl peroxide. The reactor is closed, cooled to —70° C. in a solid carbon dioxide/methanol bath and subsequently evacuated. The reactor is allowed to warm to room temperature and placed in a heater cell in a shaker box. A source of mixed ethylene and 3,3,3-trifluoropropene (96% ethylene by weight) under high pressure is attached to the reactor and this mixture of monomers pressured into the reactor for a period of 17.5 hours at temperatures in the range 68 to 74° C. with shaking, sufficient mixed gases being present at all times to maintain the internal pressure in the reactor in the range 875 to 980 atmospheres throughout the duration of the run. At the end of the reaction period, the tube is cooled to 25° C., excess pressure bled to the atmosphere, and the reactor opened. There is obtained by filtration and subsequent vacuum drying 5.5 parts of a copolymer of 3,3,3-trifluoropropene and ethylene.

This copolymer is found to contain 12.8% fluorine by analysis, which corresponds to a copolymer containing 21.6% 3,3,3-trifluoroprene and 78.4% ethylene. This copolymer can be pressed into clear, tough, elastic films in a laboratory Carver press at temperatures in the vicinity of 140° C. The films so obtained exhibit a zero-strength temperature of 83° C. and are about ⅓ as stiff, i. e., 3 times as limp, as polyethylene films of like thickness. Thus, Olsen stiffness values of 6,300 lbs./sq. in. are obtained with pressed 10 mil films from the above copolymer vs. values of 20,000 lbs./sq. in. for pressed films of polyethylene. In comparison with the properties of the homopolymers of the monomers used in the practice of this invention, and in fact in comparison with the properties of polymeric materials in general, the combination of toughness and limpness possessed by the present copolymers is unusual and is particularly valuable in the manufacture of synthetic fabrics and in fabric-replacement films where toughness and drape are important qualities.

The Olsen stiffness values referred to here, and subsequently in this specification, were determined by ASTM Test D-747-43T, "Stiffness in Flexure of Non-Rigid Plastics." The zero-strength temperature referred to here, and subsequently in this specification is that temperature at which a film of the material involved loses all strength under a load of 12 lbs./sq. in.

Example II

Into a silver-lined reactor equipped for operations under high pressure, which has been just previously flushed with oxygen-free nitrogen, is charged 200 parts of oxygen-free water and 0.15 part of lauroyl peroxide. The reactor is closed, cooled to —70° C. in a solid carbon dioxide/methanol bath and subsequently evacuated. There is then injected into the reactor 10 parts of 3,3,3-trifluoropropene and 90 parts of ethylene. The reactor is then placed in a heater cell in a shaker box. The reactor is connected to a source of deoxygenated water under high pressure. Shaking is started and water is injected into the reactor at intervals in such a manner that the internal pressure of the reactor is maintained in the range 850 to 1000 atmospheres during a period of 19 hours while the reactor is maintained at a temperature in the range of 68 to 72° C. At the end of this time the reactor is cooled to 25° C., the excess pressure vented to the atmosphere and the reactor opened. Thirty (30) parts of a copolymer of 3,3,3-trifluoropropene and ethylene is obtained by filtration and subsequent vacuum drying. This copolymer contains 17.1% fluorine by analysis, which corresponds to a copolymer having 29% 3,3,3-trifluoropropene and 71% ethylene.

The copolymer can be pressed at temperatures in the vicinity of 140° C. in a Carver laboratory press into clear, tough films exhibiting high tear-strength (values of 528 for a 12 mil film in the Elmendorf tear test—described in Technical Association of the Pulp and Paper Industry, Standard Method T-414-m-42) and a zero-strength temperature of 92° C. The films are extremely pliable, exhibiting values for 10 mil films of 1,100 lbs./sq. in. on the Olsen stiffness scale vs. comparable films of polyethylene which exhibit 20,000 lbs./sq. in. stiffness on the same scale. The films are also markedly resilient exhibiting values of 41 in the Bashore resilience test vs. 23 for polyethylene, 38 for Buna S tread-stock, and 43 for Hevea natural rubber tread-stock.

As tested on the Cambridge fiber extensometer, strips, 25 mm. long, of 6.4 mil pressed films of this copolymer exhibited 24.0% and 24.7% work recovery when elongated 300% at rates of 2.5 and 4.5 mm./min., whereas like strips of 6.7 mil pressed films of polyethylene exhibited only 11.1% and 10.4% work recovery in the same test, thus well illustrating the superior elasticity of this copolymer. In comparison to polytetrafluoroethylene, which is a known polymer of valuable properties, the present copolymer yields films which are more tear resistant and have better drape and elongation. This copolymer also has the great advantage over polytetrafluoroethylene of being easily worked, whereas polytetrafluoroethylene requires highly specialized techniques of limited applicability in its fabrication.

*Example III*

A silver-lined, high pressure reactor is charged as described in Example II with 225 parts of oxygen-free water, 0.15 part of lauroyl peroxide, 15 parts of 3,3,3-trifluoropropene, and 35 parts of ethylene. The copolymerization is carried out by the water injection technique described in Example II at temperatures in the range 67 to 72° C. and pressures in the range 850 to 1000 atmospheres, during a reaction time of 18.5 hours. The product is isolated in the same manner as previously described. There is obtained 27 parts of a copolymer of 3,3,3-trifluoropropene and ethylene which contains 31.6% fluorine. This corresponds to a copolymer containing 53.1% 3,3,3-trifluoropropene and 46.9% ethylene. This copolymer can be pressed at temperatures in the vicinity of 160° C. in a Carver laboratory press into clear, slightly tacky films which exhibit markedly superior drape qualities to those of polyethylene films and a zero-strength temperature of 105 C.

The polymerizable ethylenically unsaturated aliphatic hydrocarbons used in the practice of this invention are preferably those which contain from two to four carbon atoms and in which the unsaturation present consists of a single ethylenic double bond, and particularly of a terminal ethylenic double bond. Examples of hydrocarbons of this kind in addition to ethylene are propylene, isobutylene and butene-1.

In the novel copolymers of this invention, prepared by polymerizing a mixture of monomeric 3,3,3-trifluoropropene with at least one other ethylenically unsaturated aliphatic hydrocarbon, the percentage of combined 3,3,3-trifluoropropene can be from 5 to 95% of these polymerized components contained in the copolymer. Although copolymers containing smaller proportions of the 3,3,3-trifluoropropene can be prepared, 5% is, practically speaking, about the smallest amount which will effect significant modification of the physical properties of the resultant copolymer in comparison with the homopolymers of the comonomers. Especially preferred among these copolymers are those which contain from 10 to 55% of combined 3,3,3-trifluoropropene. The copolymers of this composition combine to an unusually high degree the properties of good elasticity, easy workability and clarity.

Copolymers containing higher proportions of the 3,3,3-trifluoropropene can also be obtained, but 95% is about the highest amount which will effect significant modification of the physical properties of the resultant copolymer in comparison with the homopolymer of 3,3,3-trifluoropropene.

The above described copolymers can be modified if desired by including with the mixture of ethylenically unsaturated aliphatic hydrocarbon and 3,3,3-trifluoropropene any of the compounds known to be polymerizable under the reaction conditions used. These latter compounds when employed are preferably present in the mixture of monomers in minor amount, that is in amount yielding a copolymer containing in combined form less than 50% of the modifying ingredient on the basis of the weight of the resulting polymer. These modifying comonomers are usually organic compounds containing terminal unsaturated and include vinyl and vinylidene compounds, such as vinyl chloride, vinyl fluoride, acrylonitrile, methyl acrylate, vinylidene chloride, vinylidene fluoride, methyl methacrylate and methacrylonitrile; diene hydrocarbons, such as butadiene, and isoprene; halogenated monoolefinic hydrocarbons, such as tetrafluoroethylene, chlorotrifluoroethylene, 1,1-dichloro-2,2-difluoroethylene, 1,2 - dichloro - 1,2-difluoroethylene, 1,2,3,3,3 - pentafluoro-1-chloropropene and 3,3-difluoro-3-chloropropene; halogenated diene hydrocarbons, such as chloroprene and fluoroprene.

Of the above modifying ingredients those preferred, because of high molecular weight and concomitant toughness in the resulting copolymer, are compounds which contain, apart from carbon and hydrogen, only halogen. Especially preferred because of the increased linearity and improved workability of the resulting copolymers are those modifying compounds of the classes described above which contain, apart from carbon and hydrogen, only halogen and only one ethylenic unsaturation.

The copolymerization can be effected in bulk, in solution, e. g., in tertiary butanol, methanol, or benzene, or in emulsion, by application of heat, light, oxygen and/or polymerization catalysts, and may be carried out as a batch, semi-continuous, or continuous process.

A wide variety of polymerization catalysts can be employed in the practice of this invention. In general any catalyst which is capable of polymerizing ethylene to a solid polymer is effective. The catalyst used should be employed in an amount in excess of 0.001% (based on the total weight of monomers involved). In general not more than 5.0% catalyst is used—the preferred amount being between 0.1 and 1.0%. Among the most useful catalysts are the peroxygen and azo compounds. By peroxygen compound is meant a compound containing the peroxygen linkage (—O—O—) and by azo compound is meant a compound containing the azo linkage (—N=N—). Suitable peroxy catalysts comprise diacyl peroxides, e. g., benzoyl peroxide and lauroyl peroxide; dialkyl peroxides, e. g., diethyl peroxide, hydroperoxides, e. g., tertiary butyl hydroperoxide and hydrogen peroxide; metallic peroxides, e. g., barium peroxide and sodium peroxide; metallic peroxy salts, e. g., ammonium persulfate, sodium persulfate, potassium persulfate and the like. Examples of azo compounds include alpha, alpha'-azobis(alpha - methylbutyronitrile), 1,1'-azodicyclohexanecarbonitrile, alpha,alpha' - azodiisobutyrocarbonamide, alpha,alpha'-azobis(alpha-gamma-dimethyl-gamma-methoxyvaleronitrile), alpha,alpha'-azobisisobutyronitrile and the like.

The copolymerization is generally carried out at temperatures within the range of 0 to 250° C., preferably from 35 to 150° C., depending upon the type of catalyst used. With diacyl peroxide type catalysts, temperatures ranging from 60° to 120° C., with persulfate or azo type catalysts, 25 to 100° C., and with dialkyl peroxide type catalysts, 100 to 150° C. are used. The operable temperature range can be markedly lowered (from 0 to −25° C.) by using an azo type catalyst in conjunction with ultraviolet light. The pressures used can range from 1 to 1000 atmospheres or more. The maximum pressure is limited only by the apparatus available. Care should be taken with those polymerization mixtures containing predominant quantities of 3,3,3-trifluoropropene when under high pressures since uncontrollable reactions may occur.

Copolymers of 3,3,3-trifluoropropene with ethylene are outstanding in many respects in comparison with polyethylene. Those copolymers containing from about 10 to 95% 3,3,3-trifluoropropene by weight, are much less stiff than polyethylene, a property which is desired in many unsupported film uses. In general, these copolymers have higher tensile strength than polyethylene and, in thin sections, markedly improved tear resistance. In contrast to polyethylene, these copolymers are transparent and markedly more fire resistant, particularly in compositions containing at least 50% of 3,3,3-trifluoropropene.

The products of this invention are adapted to a variety of uses. They may be used in molding plastics, films, foils, fibrous adhesives and safety glass interliners. Fibers and films of the polymers of this invention, particularly the ethylene copolymers can be used as insulating materials by wrapping or by melt, solvent, or dispersion coating of the articles to be insulated. Solutions of the polymers, particularly the ethylene copolymers, can be used for coating wires, and such other articles as: fibers, coils, bentonite films, glass fiber, porous carbon articles, ceramics and mica. The polymers of this invention, particularly the ethylene copolymers, are particularly useful in coating and finishes applications due to their high flexibility and good elasticity. They may be used as unsupported films for the preparation of such useful articles as shower curtains, table cloths and the like. The flexibility, elasticity and easy workability of the polymers of this invention make them readily applicable in the production of coated fabrics by solution, dispersion or calender techniques. The outdoor durability of the polymers of this invention makes them of great utility for fabric and finishes uses wherein the qualities of good flexibility, elasticity and wear resistance must be coupled with good weather resistance and heat and light stability. The copolymers of this invention, particularly the ethylene copolymers, due to their outstanding pliability and toughness can be employed to advantage in films, finishes, and coated fabrics outlets without the addition of any plasticizer. Other materials now employed for these purposes must be plasticized to fulfill the requirements of high flexibility.

As many apparently widely different embodiments of this invention may be made without departing from the spirit and scope thereof, it is to be understood that this invention is not limited to the specific embodiments thereof except as defined in the appended claims.

I claim:

1. Polymeric material which comprises the polymerization product of 3,3,3-trifluoropropene and a polymerizable aliphatic hydrocarbon which contains from 2 to 4 carbon atoms, and in which the only unsaturation is a single terminal ethylenic double bond, said polymeric material containing from 5% to 95% combined 3,3,3-trifluoropropene on the basis of the weight of said ethylenically unsaturated hydrocarbon and the 3,3,3-trifluoropropene.

2. The polymeric material set forth in claim 1 in which said hydrocarbon is ethylene.

3. A process for obtaining copolymers which comprises reacting in contact with a polymerization catalyst and at a temperature of from 0° C. to 250° C., and under superatmospheric pressure a mixture of 3,3,3-trifluoropropene and a polymerizable aliphatic hydrocarbon which contains from 2 to 4 carbon atoms, and in which the only unsaturation is a single terminal ethylenic double bond, said mixture containing from 5% to 95% 3,3,3-trifluoropropene on the basis of the weight of said ethylenically unsaturated hydrocarbon and the 3,3,3-trifluoropropene.

4. The process set forth in claim 3 in which said hydrocarbon is ethylene.

HERMAN ELBERT SCHROEDER.

No references cited.